United States Patent
Eckert et al.

(10) Patent No.: US 10,310,981 B2
(45) Date of Patent: Jun. 4, 2019

(54) METHOD AND APPARATUS FOR PERFORMING MEMORY PREFETCHING

(71) Applicant: Advanced Micro Devices, Inc., Sunnyvale, CA (US)

(72) Inventors: Yasuko Eckert, Bellevue, WA (US); Nuwan Jayasena, Sunnyvale, CA (US); Reena Panda, Austin, TX (US); Onur Kayiran, Sunnyvale, CA (US); Michael W. Boyer, Bellevue, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 141 days.

(21) Appl. No.: 15/268,953

(22) Filed: Sep. 19, 2016

(65) Prior Publication Data

US 2017/0293560 A1    Oct. 12, 2017

Related U.S. Application Data

(60) Provisional application No. 62/319,604, filed on Apr. 7, 2016.

(51) Int. Cl.
*G06F 12/00*     (2006.01)
*G06F 12/0862*   (2016.01)
*G06F 13/00*     (2006.01)
*G06F 13/28*     (2006.01)

(52) U.S. Cl.
CPC .............. *G06F 12/0862* (2013.01)

(58) Field of Classification Search
CPC .................................... G06F 12/0862
See application file for complete search history.

(56) References Cited

U.S. PATENT DOCUMENTS

| | | | | |
|---|---|---|---|---|
| 5,778,436 | A * | 7/1998 | Kedem | G06F 12/0862 711/122 |
| 8,250,307 | B2 * | 8/2012 | Arimilli | G06F 9/30043 711/118 |
| 2009/0287884 | A1 * | 11/2009 | Toyoshima | G06F 8/4442 711/137 |
| 2016/0371187 | A1 * | 12/2016 | Roberts | G06F 12/0862 |
| 2017/0091104 | A1 * | 3/2017 | Rafacz | G06F 12/0862 |
| 2017/0255395 | A1 * | 9/2017 | Weiner | G06F 3/0611 |

OTHER PUBLICATIONS

Jog, A. et al., "Orchestrated Scheduling and Prefetching for GPGPUs", Proceedings of the 40th Annual International Syposium on Computer Architecture, Jun. 23-27, 2013, pp. 332-343, ACM, Tel-Aviv, Israel.

Carter, J. et al., "Impulse: Building a Smarter Memory Controller", Proceedings of the Fifth International Symposium on High-Performance Computer Architecture, Jan. 9-13, 1999, pp. 70-79, IEEE, Orlando, FL, USA.

(Continued)

*Primary Examiner* — Mark A Giardino, Jr.
(74) *Attorney, Agent, or Firm* — Volpe and Koenig, P.C.

(57) ABSTRACT

A method and apparatus for performing memory prefetching includes determining whether to initiate prefetching. Upon a determination to initiate prefetching, a first memory row is determined as a suitable prefetch candidate, and it is determined whether a particular set of one or more cachelines of the first memory row is to be prefetched.

16 Claims, 2 Drawing Sheets

(56) References Cited

OTHER PUBLICATIONS

Yedlapalli, P. et al., "Meeting Midway: Improving CMP Performance with Memory-Side Prefetching", Proceedings of the 22nd International Conference on Parallel Architectures and Compilation Techniques, Sep. 7-11, 2013, pp. 289-298, IEEE Computer Society, Edinburgh, UK.

Hur, I. et al., "Memory Prefetching Using Adaptive Stream Detection", Proceedings of the 39th Annual IEEE/ACM International Symposium on Microarchitecture, Dec. 9-13, 2006, pp. 397-408, IEEE Computer Society, Orlando, FL, USA.

\* cited by examiner

METHOD AND APPARATUS FOR PERFORMING MEMORY PREFETCHING

CROSS REFERENCE TO RELATED APPLICATIONS

This Application claims the benefit of U.S. Provisional Application Ser. No. 62/319,604, filed on Apr. 7, 2016, the contents of which are incorporated by reference herein.

STATEMENT REGARDING FEDERALLY SPONSORED RESEARCH

This invention was made with government support under Prime Contract Number DE-AC52-07NA27344, Subcontract Number B609201 awarded by the United States Department of Energy. The government has certain rights in the invention.

BACKGROUND

Hardware prefetching is not commonly employed in Graphics Processing Units (GPUs), even though they may have superior spatial locality, because demand requests may saturate the available memory bandwidth of planar, two-dimensional (2D) memory. However, prefetching is useful, for example, with die-stacked memory, which has much higher memory bandwidth at lower per-access energy cost than 2D memory.

However, GPUs consume a large amount of memory bandwidth, (e.g., with demand requests), which may result in large queuing latency at the memory controllers, thereby affecting the GPU performance. The introduction of stacked dynamic random access memory (DRAM) may address this issue and facilitate hardware prefetching for GPUs. However, since memory bandwidth is a shared, finite resource even with stacked memory, it may be desirable to issue prefetches only when the bandwidth is available or is not heavily utilized by demand requests.

BRIEF DESCRIPTION OF THE DRAWINGS

A more detailed understanding can be had from the following description, given by way of example in conjunction with the accompanying drawings.

DETAILED DESCRIPTION

Some processors, such as Graphics Processing Units (GPUs), for example, employ hundreds and thousands of concurrent and parallel threads of execution in order to hide the impact of memory access latencies on overall performance. However, the significantly high number of execution contexts/threads can limit the effectiveness of the on-chip caching structures because of contention and thrashing effects among concurrent work threads. Although further detail will be described below, brief mechanisms are herein disclosed to detect spatial locality and temporal reusability patterns in processor memory access streams and to intelligently prefetch high-demand memory regions to improve the memory access performance of the processor. Techniques to throttle the aggressiveness and management of a prefetcher and prefetch buffer/caching structures in order to mitigate the effects of thrashing among prefetched data are also provided.

Modern main memory can be based on dynamic random access memory (DRAM). The memory of a modern computing system is typically organized as a combination of multiple memory modules or devices as opposed to a single block. Each memory device/module is internally further sub-divided into memory banks, which are typically two-dimensional (2D) arrays of memory cells. Each bank is accessed by activating a row of its 2D array of cells, and then accessing subsets of data within the activated row, known as column accesses. Each row of a memory bank (e.g., in DRAM) is typically large enough to hold multiple processor cachelines. DRAM devices/modules can employ peripheral storage structures, referred to as row buffers, (e.g., at least one per bank), to hold the currently activated row(s) from which column accesses can be performed. Accessing data from an activated row in a row buffer incurs much lower latency and energy compared to accessing a DRAM memory bank's memory cell array to activate a new row. A DRAM row can also be referred to as a DRAM page in this context.

A method for performing memory prefetching is disclosed herein. The method includes determining whether to initiate prefetching. Upon a determination to initiate prefetching, it is determined whether a particular cacheline or a set of cache lines from a first row of a DRAM device is to be prefetched.

An apparatus for performing memory prefetching is disclosed herein. The apparatus includes a memory and a memory controller. The memory controller includes a prefetch logic and a prefetch buffer. The prefetch logic is configured to determine whether to initiate prefetching, and upon a determination to initiate prefetching, determine a first row of a DRAM from which to prefetch, and whether a particular cacheline or a set of cachelines of the first row is to be prefetched.

Figure 1:
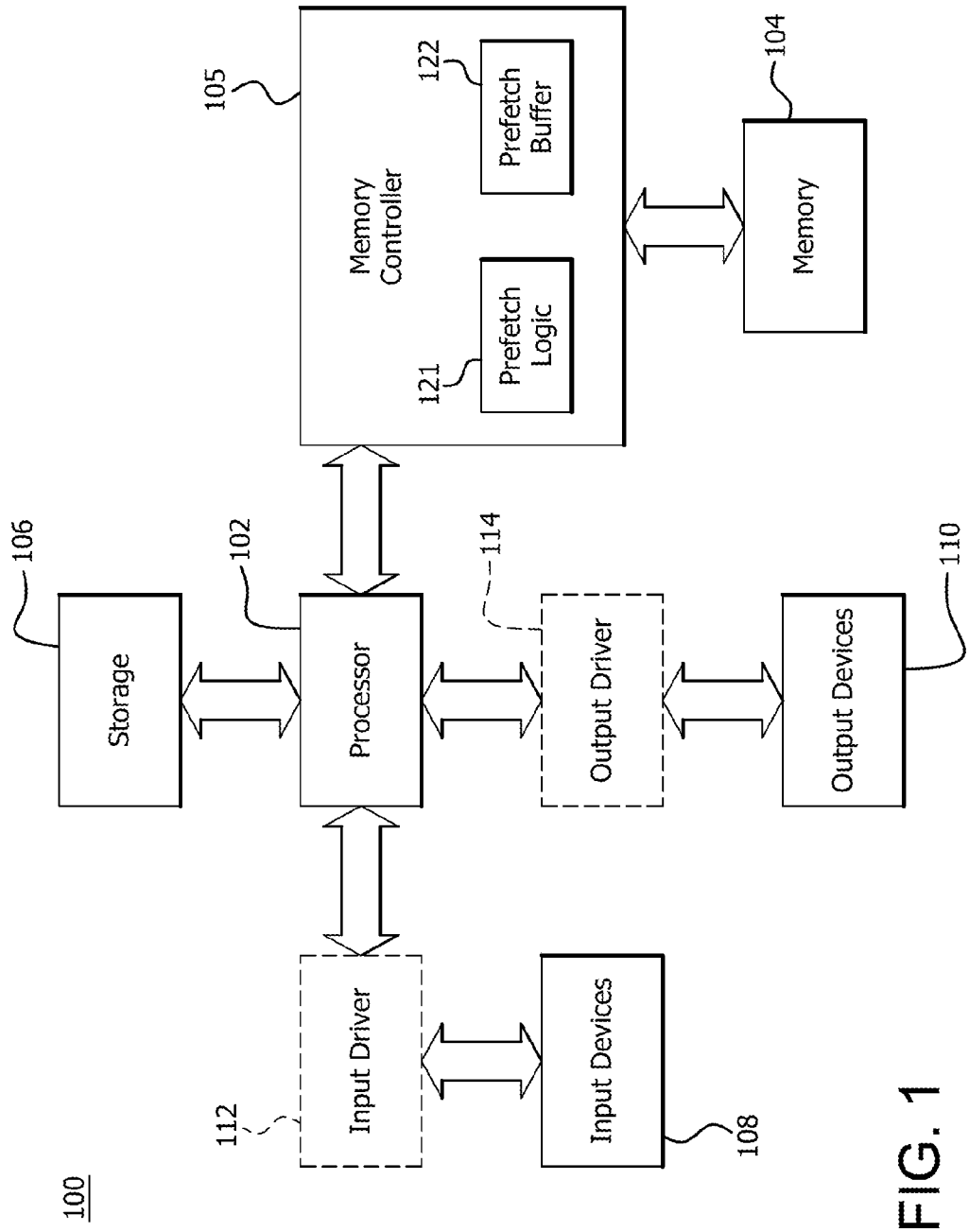
FIG. 1 is a block diagram of an example device in which one or more disclosed examples can be implemented.

FIG. 1 is a block diagram of an example device 100 in which one or more disclosed embodiments can be implemented. The device 100 can include, for example, a computer, a gaming device, a handheld device, a set-top box, a television, a mobile phone, or a tablet computer. The device 100 includes a processor 102, a memory 104, a memory controller 105, a storage 106, one or more input devices 108, and one or more output devices 110. The device 100 can also optionally include an input driver 112 and an output driver 114.

The processor 102 can include a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 can include a volatile or non-volatile memory, for example, random access memory (RAM), dynamic RAM (DRAM), or a cache. The memory controller 105 can include prefetch logic 121 and a prefetch buffer 122. The prefetch logic 121 can perform the determinations regarding prefetching described herein and the prefetch buffer 122 can be utilized to store data that is prefetched from the memory 104.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
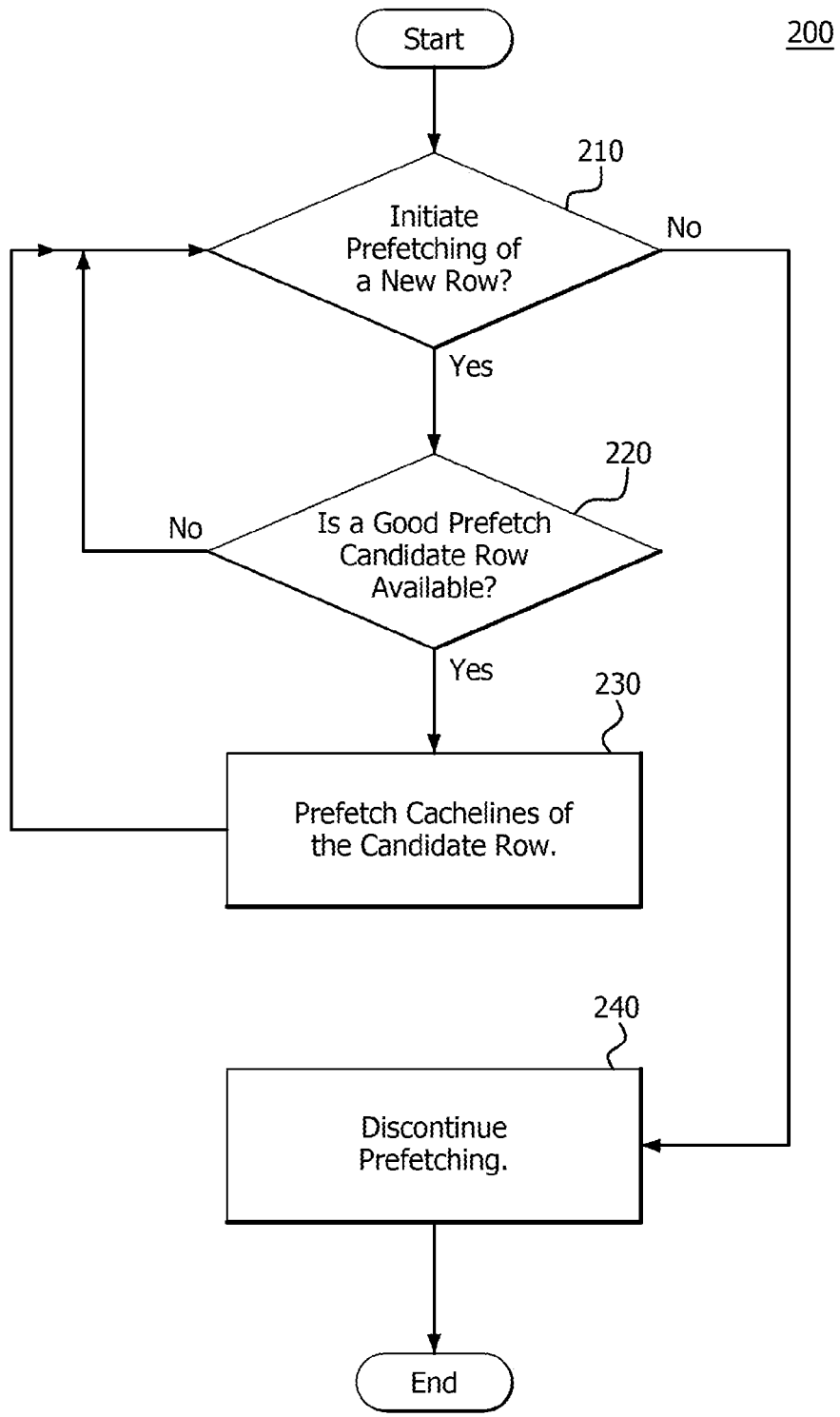
FIG. 2 is a flow diagram of an example method for performing a memory prefetch.

FIG. 2 is a flow diagram of an example method 200 for performing memory prefetching. In step 210, it is determined whether or not to initiate prefetching of cachelines from a new DRAM row. This involves a determination of aggressiveness in order, for example, to mitigate the effects of thrashing and contention at the prefetch buffer/caching structures when prefetching is not desirable. To determine the aggressiveness of the prefetching, criteria are evaluated to determine whether or not prefetching of a new row should be initiated (or whether prefetching should be initiated at all). If the criteria are met, the method proceeds to step 220. If it is determined that the criteria are not met, the method proceeds to step 250 where prefetching is discontinued or not initiated.

In one example, prefetching is initiated if there is space in the prefetch buffer. In another example, prefetching is initiated when it can be done without delaying demand fetches, (i.e., during idle cycles in the memory bank and memory interface). In yet another example, prefetching is initiated when a currently open DRAM row is to be closed.

A determination to initiate prefetching can be gated by other factors. In one example, if it is determined that there are greater than a predetermined number of outstanding demand requests to a DRAM bank, or if there is a demand fetch that requires closing a currently open DRAM row in a bank and that fetch request has been waiting greater than a predefined number of time cycles, then prefetching from that bank is not initiated.

Once it is determined to initiate prefetching of a new row in step 210, in step 220, it is determined whether a row that is a good prefetch candidate exists, (i.e., is available). This is performed by determining whether a row's spatial locality is above a predetermined threshold and detecting and identifying patterns in the memory access behavior employed by various applications. For example, a higher number of cache lines from the same row buffer having been accessed can be an indication of strong spatial locality.

For example, one or more cachelines from an open DRAM row is prefetched when the number of outstanding demand requests to that row meets or exceeds a threshold. In another example, one or more cachelines from an open DRAM row is prefetched if the candidate row has been accessed N or more number of times during a predefined time interval or within the preceding M total DRAM accesses, where N and M are predefined numbers and M is a greater value than N.

Additionally, the reuse distance of the candidate row is measured by determining the time/distance between accesses to the same candidate row, and prefetching is performed if the distance is less than a predefined value. In yet another example, one or more cachelines from an open DRAM row is prefetched when the request to the row is from a wavefront that contains a predefined number of work items or threads which share the same instruction but tend to have divergent memory accesses, and the wavefront has accessed the row at least a predefined number of times out of the total number of times during the last DRAM accesses.

Additionally, if a predefined number of different wavefronts have accessed disjointed parts of a row, prefetching is performed for one or more of the cachelines of that row. Furthermore, a list of the most recently closed number of pages in each bank is kept. If a page on the list is re-opened, the rest of the page's contents are prefetched. A bit vector of the cachelines accessed from each open row is maintained and if more than a predefined percentage of a row has been accessed, the rest of that row is prefetched before closing it, or prefetching is performed only if the accessed lines are clustered on one part of the row, (e.g., if the first half of a row is heavily accessed but the second half is not, then only the second half is prefetched).

Prefetching can also be performed by putting the accessed-lines-bit-vector in the recently closed list so that the set of cachelines to be prefetched is reduced and/or refined to only those that have not already been accessed recently. That is, lines that have already been accessed on the previous opening or recent openings are skipped. In the example above, the number of indices in the bit vector is the same as the number of cachelines in a DRAM row, creating a one-to-one correspondence, (i.e., one bit per index). A "0" value indicates the associated cacheline has not been accessed while a "1" value indicates it has been accessed.

Prefetching of a DRAM row can be performed when that DRAM row has experienced a predefined number of conflicting row buffer accesses that caused other active rows to be closed, has had less than a threshold number of unique cachelines accessed, or is part of a memory region that has experienced at least a threshold number of demand requests out of the last number of predefined memory accesses.

Once a good candidate row has been determined for prefetching (step 220), cachelines of that row are prefetched (step 230). That is, unaccessed cache lines from the already open DRAM candidate row, for example, are prefetched before closing the row. Additionally, various criteria are employed to determine which cachelines of the candidate row are prefetched. Alternatively, if it is determined in step 220 that a good candidate row for prefetching is not available, then the method reverts to step 210.

Additionally, to aid in determining the aggressiveness of prefetching, once cachelines are prefetched from a good candidate row (step 220), they are tagged, (e.g., assigned), with an indication of which of the multiple criteria for determining a candidate row caused the prefetch. These tags are rated and a "score" assigned to the each of the prefetch criteria in use. The scoring is based on the usefulness of the prefetched data.

For example, a prefetched cacheline that satisfies a subsequent demand request has the score of the criteria that caused the prefetch increased. On the other hand, the score is decreased of a criteria that caused the prefetching of a cacheline that gets evicted from a prefetch buffer/caching structure without satisfying any demand requests. Candidate row selection criteria with higher scores are prioritized when selecting among multiple candidate rows to prefetch based on different criteria. Candidate rows selected by criteria with scores above a predefined threshold are allowed to be prefetched even when they result in delays to demand fetches, (e.g., demand fetches beyond what is otherwise allowed by the baseline policy). Candidate row selection criteria with scores below another predefined threshold are prevented from initiating further prefetches.

The above scores are reset periodically, (e.g., at fixed intervals or at fixed events such as computation routine or kernel boundaries or application phases). Additionally, scores are gradually adjusted closer to their initial levels at fixed intervals or at specific events such as computation kernel boundaries. Accordingly, the "scoring" technique measures which prefetches resulted in subsequent hits in the level of cache the data was placed or whether they were flushed to lower levels before being demand-used. Such additional information can be used to tune which level of the cache hierarchy each prefetch is placed, (e.g., L1 cache, L2 cache, or the prefetch buffer).

Once prefetched, the cachelines of the row are then be inserted into a prefetch buffer/caching structure, (e.g., prefetch buffer 122), and a subsequent determination to remove or evict the cacheline is performed based upon a set of criteria. For example, criteria include whether a prefetched row has received a threshold number of demand requests, or if the prefetched row has not received any demand requests in the past predefined number of demand requests. Additionally, it can be determined whether the prefetched row has a threshold number of unique cachelines accessed, or whether the prefetched row has not seen any accesses in the past predefined number of cycles. Accordingly, when currently cached rows in the prefetch buffer are predicted to be dead, (e.g., useless), they are evicted and new prefetching is initiated.

The above prefetching method can be applied to various memory technologies including both volatile and non-volatile memory and can be implemented with respect to various types of processors, (e.g. GPUs, CPUs and accelerators).

It should be understood that many variations are possible based on the disclosure herein. Although features and elements are described above in particular combinations, each feature or element can be used alone without the other features and elements or in various combinations with or without other features and elements. For example, the prefetch logic 121 performs the method described above.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing memory prefetching, to improve memory access performance of a processor, the method comprising:
   determining, by a prefetch logic of a memory controller communicatively coupled to a memory and a prefetch buffer, whether to initiate prefetching;
   upon a determination to initiate prefetching, determining, by the prefetch logic, a first memory row as a suitable prefetch candidate;
   assigning, by the prefetch logic, a score to a criteria used to determine that a particular one or more cachelines of the first row is to be prefetched, wherein when the score of a first criteria exceeds the score of a second criteria, a row determined to be a prefetch candidate by the first criteria is prioritized for prefetching over a row determined to be a prefetch candidate by the second criteria;
   determining, by the prefetch logic, whether the particular set of one or more cachelines of the first memory row is to be prefetched based on the score; and
   retrieving, by the processor, data from the particular set of one or more cachelines.

2. The method of claim 1 wherein determining to initiate prefetching includes any one of: determining there is storage space in the prefetch buffer to store one or more prefetched cachelines, or determining that an open memory row is to be closed.

3. The method of claim 1 wherein determining to not initiate prefetching includes any one of: determining a number of outstanding demand requests to a same memory bank that contains the first memory row exceeds a threshold, or determining a demand fetch that has been waiting a number of time cycles that exceeds a threshold requires closing the first memory row.

4. The method of claim 1 wherein determining whether the first row is a suitable prefetch candidate includes determining whether the accessing of unique cachelines from the first row exceeds a predetermined threshold.

5. The method of claim 1 wherein determining whether the first row is a suitable prefetch candidate includes determining that a number of outstanding demand requests to the first row meets or exceeds a threshold.

6. The method of claim 1 wherein determining whether the first row is a suitable prefetch candidate includes whether the number of times the first row has been accessed exceeds a threshold.

7. The method of claim 1, further comprising increasing the assigned score of the criteria if the prefetched particular cacheline satisfies a subsequent demand request.

8. The method of claim 1, further comprising decreasing the score of the criteria if the particular cacheline is evicted from the prefetch buffer without satisfying a demand request.

9. The method of claim 1 wherein when the score of a first criteria is less than a threshold, a row determined to be a prefetch candidate by the first criteria is not prefetched.

10. A computer system to improve memory access performance, comprising:
    a processor;
    a memory; and
    a memory controller communicatively coupled with the memory and the processor, the memory controller including a prefetch logic and a prefetch buffer communicatively coupled with one another, wherein the prefetch logic is configured to determine whether to initiate prefetching, and upon a determination to initiate prefetching, determine a first memory row as a suitable prefetch candidate, assign a score to a criteria used to determine that a particular one or more cachelines of the first row is to be prefetched wherein when the score of a first criteria exceeds the score of a second criteria, a row determined to be a prefetch candidate by the first criteria is prioritized for prefetching over a row determined to be a prefetch candidate by the second criteria, determine whether the particular set of one or more cachelines of the first memory row is to be prefetched based on the score, and wherein the processor retrieves data from the particular set of one or more cachelines.

11. The computer system of claim 10 wherein the prefetch logic is further configured to initiate prefetching upon a determination of any one of: determining there is storage space in the prefetch buffer to store one or more prefetched cachelines, or determining that an open memory row is to be closed.

12. The computer system of claim 10 wherein the prefetch logic is further configured to not initiate prefetching upon a determination of any one of: determining a number of outstanding demand requests to a same memory bank that contains the first memory row exceeds a threshold, or determining a demand fetch that has been waiting a number of time cycles that exceeds a threshold requires closing the first memory row.

13. The computer system of claim 10 wherein the prefetch logic is further configured to determine whether the first row is a suitable prefetch candidate by determining whether the accessing of unique cachelines from the first row exceeds a predetermined threshold.

14. The computer system of claim 10 wherein the score of the criteria is increased if the prefetched particular cacheline satisfies a subsequent demand request.

15. The computer system of claim 10 wherein the score of the criteria is decreased if the particular cacheline is evicted from the prefetch buffer without satisfying a demand request.

16. The computer system of claim 10 wherein when the score of a first criteria is less than a threshold, a row determined to be a prefetch candidate by the first criteria is not prefetched.

* * * * *